June 30, 1936.  E. WITTE  2,045,743
COLORIMETER
Filed Oct. 12, 1933

Inventor:
Emil Witte
by
Paul Fenchland
Attorney

Patented June 30, 1936

2,045,743

UNITED STATES PATENT OFFICE 2,045,743

COLORIMETER

Emil Witte, Dresden-Loschwitz, Germany

Application October 12, 1933, Serial No. 693,321
In Germany October 15, 1932

1 Claim. (Cl. 88—14)

This invention relates to a colorimeter for measuring the white contents of pigments.

Pigments are generally measured by means of universal instruments which owing to their complicated construction are expensive and are subject to certain conditions of illumination; moreover their manipulation is difficult.

The object of the present invention is to provide a very simple colorimeter the use of which is restricted to measuring the white contents of pigments and which is always ready for use.

In this device the pigment to be measured (the sample) is compared with a known or standard pigment in the well known manner. The novel feature consists in arranging a source of light shiftably in a casing between the sample and the standard upon a scale and shifting the said source of light until the sample and the standard when inspected through a Lummer cube or the like show the same color, i. e. the same brightness. Every position of the lamp corresponds to a certain white content which is previously stated by gauging according to standard pigments.

When fine powders or soft substances are subjected to measurement, the tint varies according to the pressure employed. This may be avoided as far as possible by inserting springs or pads and thereby securing a uniform pressure.

Figure 2:
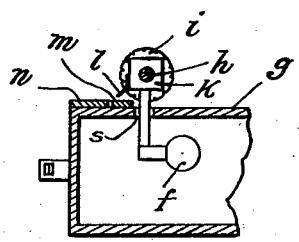
Figure 1:
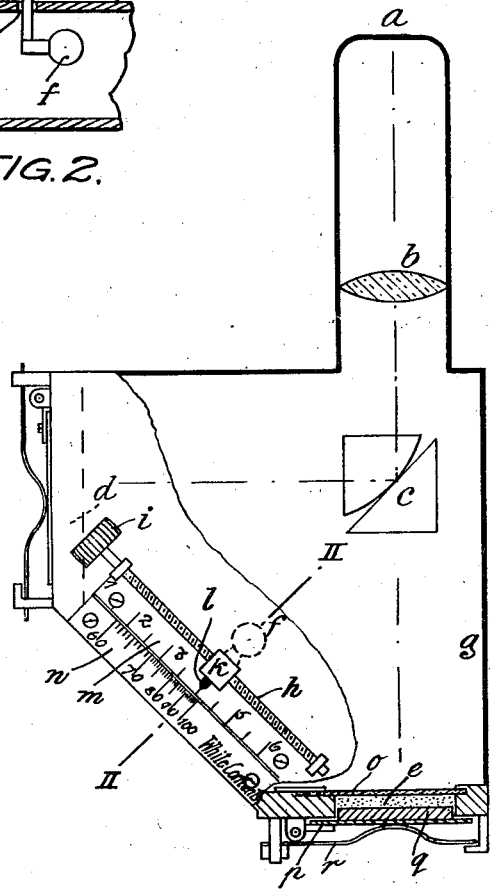

The invention is illustrated by way of example in the annexed drawing of which Fig. 1 shows the apparatus partly in cross-section and partly in elevation whereas Fig. 2 is a fractional cross-section on the line II—II of Fig. 1. $a$ is a peephole and $b$ a lens through which the circular image of the sample $d$ formed in the contact surface of the double prism $c$ is inspected, said image being surrounded by the annular image of the standard pigment $e$. Light is supplied from the glow-lamp $f$ which is slidably arranged within the casing $g$. For this purpose a male screw $h$ is arranged outside the casing provided with a head $i$ and cooperating with a nut $k$. This nut carries by means of an arm penetrating the casing through a slot $s$ (see Fig. 2), the lamp $f$ and, on the other hand, outside the casing a pointer or index $l$. The latter slides on a scale $m$ along which a second exchangeable scale $n$ is arranged. The electric current is supplied by a small galvanic battery or other source of electricity located inside or outside the casing. The current is switched on by means of a button or the like for no longer time than required for inspecting the sample.

As in the first place fine dusts are to be measured or compared the device for receiving the sample $d$ is similar to that for receiving the standard $e$. The wall of the casing which is about 1 cm. in thickness where the standard is inserted has a quadrangular opening closed from the inside by a pane of glass $o$ and from the outside by a cover plate $p$ carrying an inner pad $q$ and pressed onto the casing by a resilient clamp $r$.

The measurement is effected by rotating the head $i$ on the screw $h$ whereby the lamp $f$ is shifted until the two images, the inner circle and the outer ring show exactly the same brightness, that is to say until the difference between the two images disappears and only a single surface of uniform brightness is visible.

The position of the lamp is read from the position of the pointer $l$ on the scale $m$ and converted into white contents, or is read on the exchangeable double scale directly in white contents or other equivalent values.

The device always controls a limited range at both sides of the introduced standard pigment which may be exchanged as required.

I claim:—

In a colorimeter for measuring the white contents of pigments a casing, an opening therein adapted to receive an eye-piece, another opening adapted to receive a standard surface, a third opening adapted to receive an observing glass, means for pressing a sample from without onto the said observing glass, a source of light slidably mounted in the casing and arranged so as to illuminate both the said standard surface and the said observing glass under an angle of 45°, a photometric comparison prism in the casing arranged so as to receive the light which is perpendicularly emitted from the said standard surface and the said observing glass, a slot in the casing, an arm passing therethrough and carrying the said source of light, and a pointer attached to the said arm and adapted to slide over a scale.

EMIL WITTE.